(12) United States Patent
Takasugi

(10) Patent No.: US 8,798,434 B2
(45) Date of Patent: Aug. 5, 2014

(54) IMAGE PROCESSING SYSTEM FOR OUTPUTTING SIGNALS WHEN AN IMAGE OF A SPECIFIC OBJECT OVERLAPS PLAYING REGIONS, AND STORAGE MEDIUM IN WHICH AN IMAGE PROCESSING PROGRAM IS STORED

(75) Inventor: Atsushi Takasugi, Tokyo (JP)

(73) Assignee: Lapis Semiconductor Co., Ltd., Yokohama (JP)

( * ) Notice: Subject to any disclaimer, the term of this patent is extended or adjusted under 35 U.S.C. 154(b) by 402 days.

(21) Appl. No.: 13/168,255

(22) Filed: Jun. 24, 2011

(65) Prior Publication Data

US 2012/0002936 A1    Jan. 5, 2012

(30) Foreign Application Priority Data

Jul. 2, 2010   (JP) ................................. 2010-152422

(51) Int. Cl.
*H04N 5/77*   (2006.01)
(52) U.S. Cl.
USPC ......................................... 386/224; 386/241
(58) Field of Classification Search
CPC ............. H04N 5/00; H04N 9/00; H04N 5/77; H04M 1/72561
USPC ................................................ 386/224, 241
See application file for complete search history.

(56) References Cited

U.S. PATENT DOCUMENTS 8,483,414 B2 *   7/2013   Kondo et al. ................. 381/306

FOREIGN PATENT DOCUMENTS

| JP | 06-092980 | 4/1994 |
|---|---|---|
| JP | 2001-184058 A | 7/2001 |
| JP | 2002-041038 A | 2/2002 |
| JP | 2003-202833 A | 7/2003 |
| JP | 2004-185565 A | 7/2004 |

* cited by examiner

*Primary Examiner* — Huy T Nguyen
(74) *Attorney, Agent, or Firm* — Rabin & Berdo, P.C.

(57) ABSTRACT

An image processing system is provided. A region specifying component specifies one or more playing regions for generating predetermined sounds in an image represented by the moving image data that have been acquired by the acquiring component. A detecting component detects a specific image showing a specific subject existing in the image represented by the moving image data that have been acquired by the acquiring component. An assigning component assigns, for each of the playing regions that have been specified by the region specifying component, sounds to be outputted in a case where the specific image that has been detected by the detecting component overlaps those playing regions. A signal outputting component outputs signals representing the sounds that have been assigned to those playing regions by the assigning component, in a case where the specific image overlaps the playing regions.

15 Claims, 16 Drawing Sheets

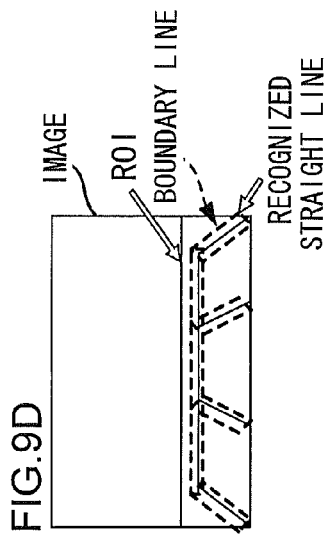
FIG.9C
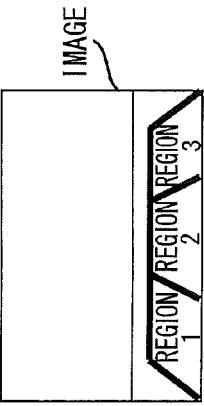
FIG.9D
FIG.9E
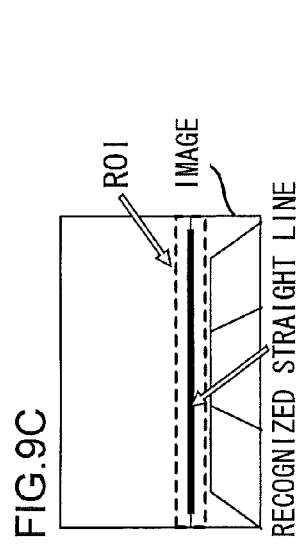
FIG.9B
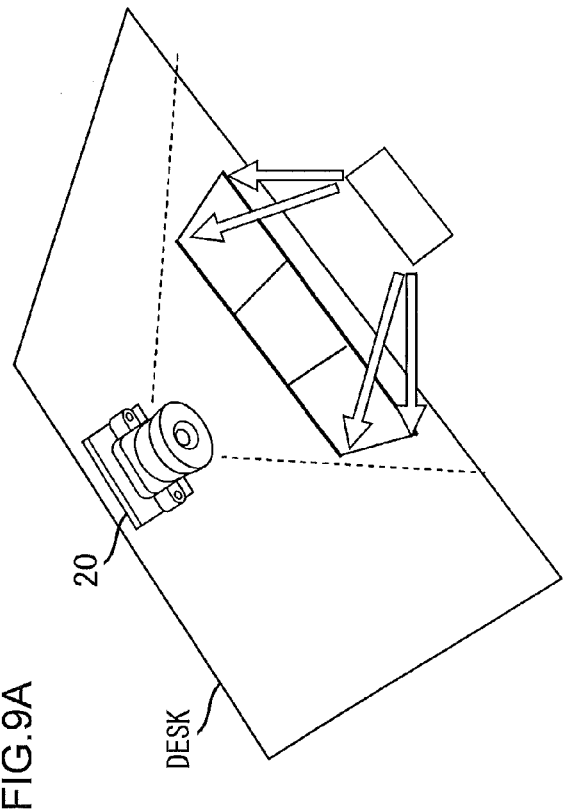
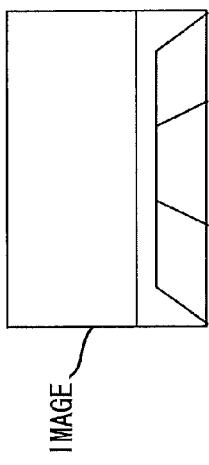
FIG.9A

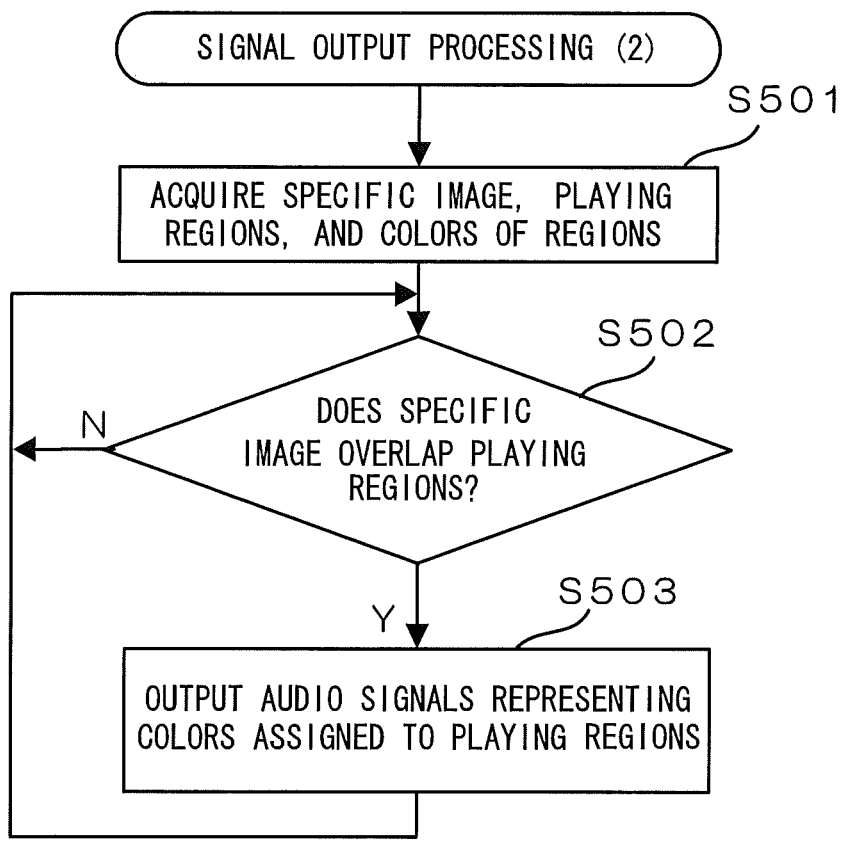

IMAGE PROCESSING SYSTEM FOR OUTPUTTING SIGNALS WHEN AN IMAGE OF A SPECIFIC OBJECT OVERLAPS PLAYING REGIONS, AND STORAGE MEDIUM IN WHICH AN IMAGE PROCESSING PROGRAM IS STORED

CROSS-REFERENCE TO RELATED APPLICATION

This application is based on and claims priority under 35 USC 119 from Japanese Patent Application No. 2010-152422 filed on Jul. 2, 2010, the disclosure of which is incorporated by reference herein.

BACKGROUND

1. Technical Field

The present invention pertains to an image processing system and a storage medium in which an image processing program is stored. The present invention particularly relates to an image processing system that uses an image to output sounds and a storage medium in which an image processing program is stored.

2. Related Art

Conventionally, devices that use an image to output sounds have been disclosed. For example, in Japanese Patent Application Laid-Open (JP-A) No. 6-92980, there is disclosed an image control device that can perform a pointing operation resulting from multiple chroma key images. The device disclosed in JP-A No. 6-92980 extracts and stores the color of gloves and/or socks colored to a conspicuous color, and in a case where that extracted color has entered an assigned region of a chosen musical instrument displayed on a background of a video image shown on a monitor screen, the sound of that chosen musical instrument is produced, and the device is configured to control the intensity of the sound by the distance between the center of gravity of the extracted color pixel group that has entered that assigned region and the center of gravity of the extracted color pixel group that has entered the assigned region.

Further, in JP-A No. 2003-202833, there is disclosed a technology where multiple pictures showing symbol patterns for sounding musical instruments shown on a screen are shown, and in a case where one of those has been selected, for example, in a case where a pattern in the shape of a finger has been selected, a predetermined musical instrument sound is produced in a case where a picture in the shape of a finger has entered a region called a tracking area that is a region for sounding a musical instrument.

In the technology of JP-A No. 2003-202833, image patterns for selection are displayed beforehand in multiple input areas set on a display screen, and by selecting any of the multiple input areas, the image pattern displayed in the selected input area is designated as a predetermined pattern.

However, in the technology disclosed in JP-A No. 6-92980, pattern detection regions are assigned beforehand on the screen, so in a case where the pattern detection regions are located on both sides of the screen, for example, it is necessary to ensure that the moving image always (for reasons having to do with operation) appears in the screen center and people must always appear in a size where it is easy for them to operate the left and right pattern detection regions. That is, there are the drawbacks that the direction of the camera, the distance from the camera, and the standing position of the player are unequivocally set and, in a case where the camera has been placed such that the instrumentalist exists in a position other than that, the instrumentalist cannot play or trouble arises.

Further, in the technology disclosed in JP-A No. 2003-202833, the input areas and the tracking areas are assigned beforehand on the screen, so it is necessary to ensure that the moving image always (in consideration of operation) appears so as to avoid the input areas and the tracking areas on the screen, and people must always appear in a size where it is easy for them to operate those input areas and tracking areas. That is, there are the drawbacks that the direction of the camera, the distance from the camera, and the standing position of the player are unequivocally set because a drawn display exists beforehand and, in a case where the camera has been placed such that the instrumentalist is in a position other than that, the instrumentalist cannot play or trouble arises.

Further, in the technology disclosed in JP-A No. 2003-202833, there has been the drawback that this invention cannot be realized unless a picture equivalent to a predetermined input area is drawn on the display device in the input area, and there has been the drawback that the drawing region on that drawing device cannot be used as a playing region.

Moreover, in the technology disclosed in JP-A No. 2003-202833, there is the drawback that its robustness with respect to the environment at the time of imaging is low which is that the musical instrument does not sound if, for example, the picture pattern in the shape of a finger does not have the same shape (or color) as the detection pattern. Specifically, for example, in an actual camera, depending on the direction of the camera and the like, sometimes only one finger can be seen in the camera even if a person holds up two fingers, so there have been the drawbacks that both when there is one finger and two fingers the device judges them as looking like a finger and produces a sound, it is not always the case that the device can recognize a designation regardless of the light ray environment and the way something appears because the brightness of the lighting, the color, and the color and shape in which something actually appears in the camera greatly differ.

In this way, in the conventional technologies, it has been necessary to fix and draw beforehand, on a screen, playing-defined regions and selection menus of patterns for recognizing operators needed to play a musical instrument. Further, pictures actuality shown on a screen as moving images are completely independent, and there have been the problems that the camera must be set to as to not depend on the display fixed on the screen or adjust the camera position such that a person arrives in a position where it is easy to operate the menus.

That is, there have been the problems that the position of the camera, the distance between the player and the camera, and the standing position of the player are restricted.

SUMMARY

In view of the above-described problems, it is an object of the present invention to provide an image processing system and an image processing program in which restrictions on the position of the camera, the distance between the player and the camera, and the standing position of the player are reduced.

A first aspect of the invention is an image processing system including: an acquiring component that captures a subject to thereby acquire moving image data representing that subject; a region specifying component that specifies one or more playing regions for generating predetermined sounds in an image represented by the moving image data that have been acquired by the acquiring component; a detecting component that detects a specific image showing a specific subject existing in the image represented by the moving image data that have been acquired by the acquiring component; an assigning component that assigns, for each of the playing regions that have been specified by the region specifying component, sounds to be outputted in a case where the specific image that has been detected by the detecting component overlaps those playing regions; and a signal outputting component which, in a case where the specific image overlaps the playing regions, outputs signals representing the sounds that have been assigned to those playing regions by the assigning component.

According to the first aspect of the invention, the acquiring component captures a subject to thereby acquire moving image data representing that subject, the region specifying component specifies one or more playing regions for generating predetermined sounds in an image represented by the moving image data that have been acquired by the acquiring component, the detecting component detects a specific image showing a specific subject existing in the image represented by the moving image data that have been acquired by the acquiring component, the assigning component assigns, for each of the playing regions that have been specified by the region specifying component, sounds to be outputted in a case where the specific image that has been detected by the detecting component overlaps those playing regions, and the signal outputting component outputs, in a case where the specific image overlaps the playing regions, signals representing the sounds that have been assigned to those playing regions by the assigning component. In this way, the first aspect can reduce restrictions on the position of the camera, the distance between the player and the camera, and the standing position of the player because it assigns the sounds to the regions in the image showing the subject regardless of the position of the camera, the distance between the player and the camera, and the standing position of the player.

In a second aspect of the invention, the image processing system further includes a dividing component that divides into multiple regions the image represented by the moving image data that have been acquired by the acquiring component, wherein the region specifying component specifies one or more of the playing regions for generating the predetermined sounds from among the regions into which the image has been divided by the dividing component.

According to the second aspect of the invention, it becomes possible to play more easily because the playing regions can be automatically divided.

In a third aspect of the invention, in the case of assigning sounds to a plurality of the playing regions, the assigning component sequentially assigns sounds with different frequencies to each of the plural playing regions.

According to the third aspect of the invention, by sequentially assigning the sounds with different frequencies to each of the plural playing regions, signals representing each of the different sounds can be outputted.

In a fourth aspect of the invention, the image processing system further includes a displaying component that displays the image represented by the moving image data that have been acquired by the acquiring component.

According to the fourth aspect of the invention, it can be made easier for the player to play because it becomes possible for the player to play while viewing the displaying component.

In a fifth aspect of the invention, the displaying component further displays boundary lines of the playing regions.

According to the fifth aspect of the invention, it can be made easier to play because, by further displaying the boundary lines on the displaying component, it becomes possible for the player to view the boundary lines.

In a sixth aspect of the invention, the playing regions that are specified by the region specifying component are shown beforehand on the subject, and the region specifying component specifies one or more of the playing regions for generating the predetermined sounds from among the regions that are shown on the subject.

According to the sixth aspect of the invention, by showing beforehand as the subject the regions that are easy for the player to play, it becomes possible to make it easier for the player to play.

In a seventh aspect of the invention, the specific subject is a subject of at least one of a subject of a predetermined color and a subject of a predetermined object.

According to the seventh aspect of the invention, a subject of at least one of the subject of the predetermined color and the predetermined object can be used as the specific subject.

In an eighth aspect of the invention, the image processing system further includes an action sensing component that senses, with the specific image that has been detected by the detecting component, an action of the specific subject and a recording component that records action information representing the action of the specific subject that has been sensed by the action sensing component, wherein in a case where the specific image overlaps the regions to which the sounds have been assigned by the assigning component and the action of the specific subject that has been sensed by the action sensing component is the action represented by the action information that has been recorded by the recording component, the signal outputting component outputs the signals representing the sounds.

According to the eighth aspect of the invention, in a case where the specific image overlaps the playing regions and the action of the specific subject that has been sensed by the action sensing component is the action represented by the action information that has been recorded by the recording component, by outputting the signals representing the sounds, the generation of signals resulting from misrecognition can be suppressed.

In a ninth aspect of the invention, the image processing system further includes a sound outputting component that outputs the sounds in accordance with the signals that have been outputted by the signal outputting component.

According to the ninth aspect of the invention, it becomes possible for the player to hear actual sounds.

A tenth aspect of the invention is a storage medium readable by a computer, the storage medium storing a program of instructions executable by the computer to function as an image processing system that includes: an acquiring component that captures a subject to thereby acquire moving image data representing that subject; a region specifying component that specifies one or more playing regions for generating predetermined sounds in an image represented by the moving image data that have been acquired by the acquiring component; a detecting component that detects a specific image showing a specific subject existing in the image represented by the moving image data that have been acquired by the acquiring component; an assigning component that assigns, for each of the playing regions that have been specified by the region specifying component, sounds to be outputted in a case where the specific image that has been detected by the detecting component overlaps those playing regions; and a signal outputting component which, in a case where the specific image overlaps the playing regions, outputs signals representing the sounds that have been assigned to those playing regions by the assigning component.

The tenth aspect of the invention acts in the same way as the first aspect, so the same effects as those of the first aspect are obtained.

According to the present invention, there is obtained the effect that an image processing system and an image processing program in which restrictions on the position of the camera, the distance between the player and the camera, and the standing position of the player are reduced can be provided.

BRIEF DESCRIPTION OF THE DRAWINGS

Exemplary embodiments of the present invention will be described in detail based on the following figures, wherein:

FIG. 9A to FIG. 9E are drawings showing an example of a case where a device capable of drawing regions on a subject such as a projector is used;

FIG. 16 is a flowchart showing details of signal output processing.

DETAILED DESCRIPTION

The best mode for carrying out the present invention will be described in detail below with reference to the drawings.

Figure 1:
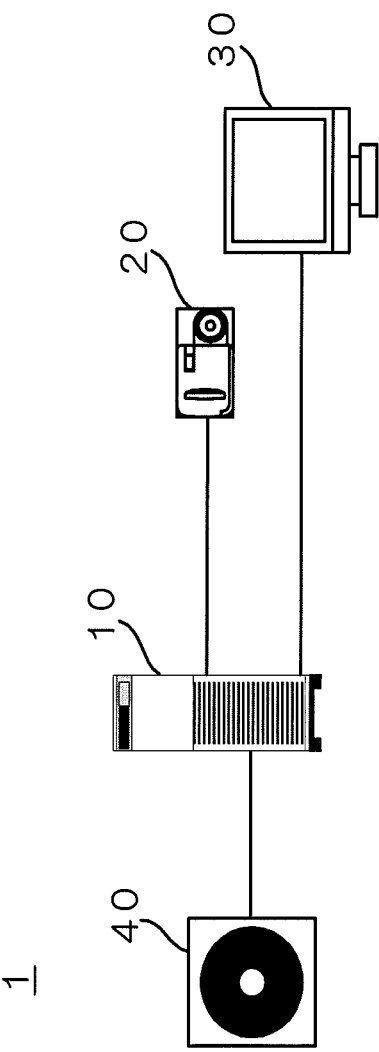
FIG. 1 is a drawing showing an image processing system pertaining to an embodiment of the present invention.

FIG. 1 is a drawing showing an image processing system 1 pertaining to the present embodiment. In FIG. 1, an image processing device 10, a camera 20 that captures a moving image, a displaying component 30, and a speaker 40 are shown.

The image processing device 10 controls the entire image processing system 1 and is disposed with a terminal (a USB terminal or the like) for connecting to the camera 20, an audio output terminal for connecting to the speaker 40, and a terminal (a DVI terminal or the like) for connecting to the displaying component 30.

The camera 20 captures a subject to thereby acquire moving image data representing that subject and is a camera such as a video camera or a digital camera that is capable of capturing a moving image. The displaying component 30 is a displaying component such as a liquid crystal display that displays an image represented by the moving image data that have been acquired by the camera 20. The speaker 40 outputs sound in accordance with a signal that has been outputted from the image processing device 10.

The minimum configuration of the image processing system 1 pertaining to the present invention in FIG. 1 is a configuration comprising the image processing device 10 and the camera 20.

Figure 2:
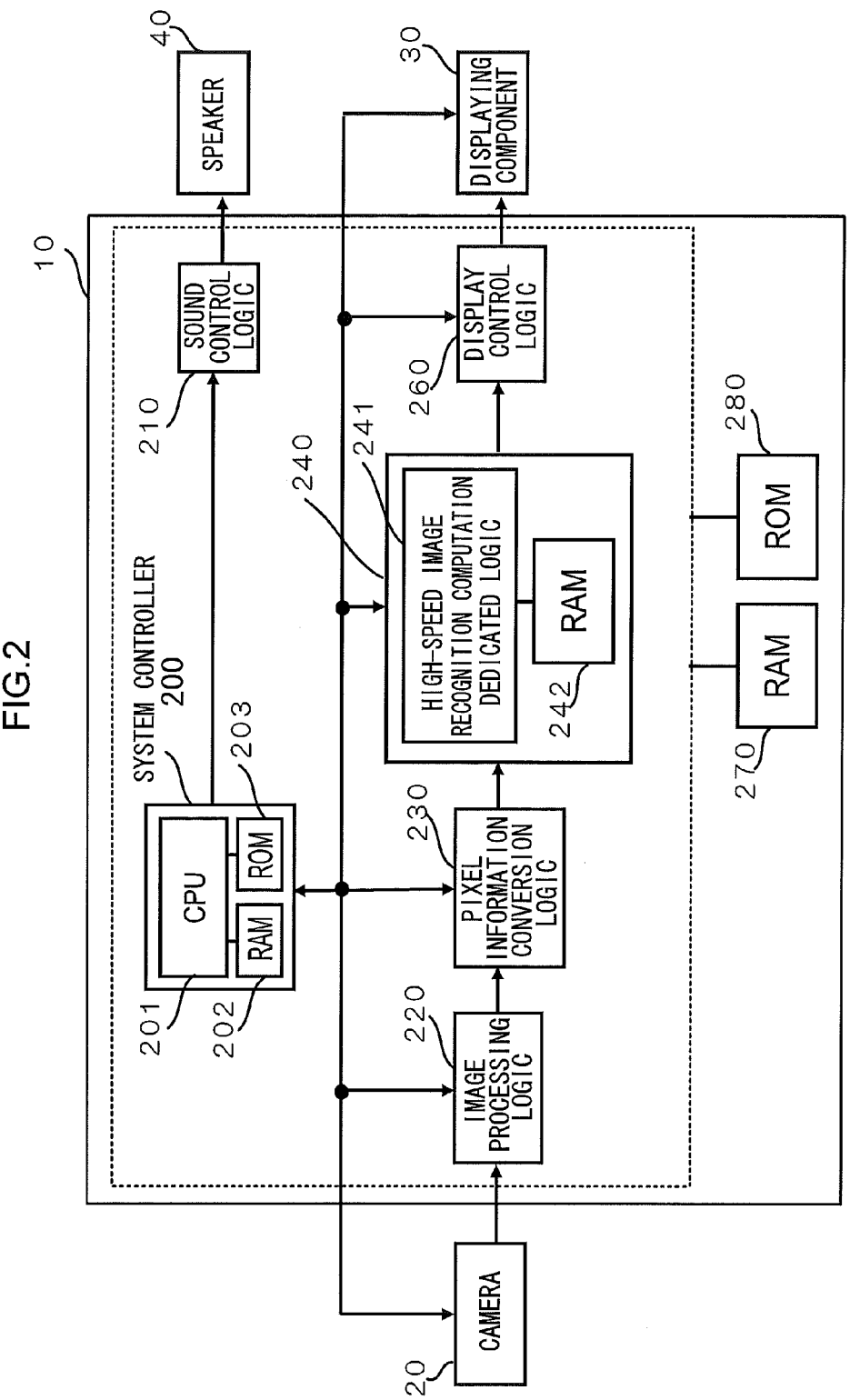
FIG. 2 is a drawing showing an example of the hardware configuration of an image processing device.

Next, two types of hardware configurations of the image processing device 10 will be described. FIG. 2 is a drawing showing an example of a hardware configuration (a first type: a hardware accelerator type) of the image processing device 10. The image processing device 10 is configured to include a system controller 200, a sound control logic 210, an image processing logic 220, a pixel information conversion logic 230, an image recognizing component 240, a display control logic 260, a random access memory (RAM) 270, a read-only memory (ROM) 280, and a bus that interconnects those.

In the RAM 270, temporary information used in each circuit of the image processing device 10 is stored. Further, in the ROM 280, a program for causing the system controller 200 to act, types of sounds and music, and information representing the shape and features of a predetermined object are stored.

Further, the system controller 200 is configured to include a central processing unit (CPU) 201, a RAM 202, and a ROM 203. This system controller 200 controls the entire image processing device 10 in accordance with a program that has been transferred from the ROM 280 to the RAM 202. In the RAM 202, the above program and temporary information relating to the control of each circuit block are stored. In the ROM 203, ID information for ensuring that a recognition algorithm for recognizing images is not hacked from the outside is stored. The program for causing the system controller 200 to act may also be stored in the ROM 203 rather than being stored in the ROM 280.

Further, the system controller 200 outputs, with respect to the sound control logic 210, codes representing types of sounds, music, and musical instruments assigned to regions and timing information for generating sounds and music.

The sound control logic 210 creates signals for causing information (MIDI information and audio waveform information) relating to the sounds stored in the ROM 280 to be generated by the speaker 40 in accordance with the codes that have been inputted from the system controller 200. At this time, the RAM 270 is used to store temporary information used in the processing by the sound control logic 210.

The image processing logic 220 corrects, with respect to the image represented by the video signal that has been outputted from the camera 20, the video signal by removing noise and enhancing edges such that the picture is made clearer and easier to recognize and outputs the corrected video signal to the pixel information conversion logic 230. At this time, the RAM 270 is used to store temporary information used in the processing by the image processing logic 220.

The pixel information conversion logic 230 extracts material information for handling by the image recognizing component 240 from the video signal that has been outputted from the image processing logic 220. This material information is various parameter information of each pixel and position information of those pixels on the picture. Specific examples of the parameter information include information relating to color—such as value information, saturation information, hue information, and luminance information—and motion components (vector information) of pixels obtained utilizing differences (delay) between pictures.

In the image recognizing component 240, image recognition is performed by a high-speed image recognition computation dedicated logic 241 in accordance with the program stored in the ROM 280. Examples of image recognition by the high-speed image recognition computation dedicated logic 241 include processing that extracts boundary lines and line components in the image represented by the video signal by binarizing the inputted luminance information.

Further, the high-speed image recognition computation dedicated logic 241 assigns numbers to objects of the same color enclosed by the extracted line components to raise the objects (grouping) and recognizes in what way the positions of those objects have changed compared to in the past or in what direction the positions of those objects have moved compared to in the past.

Moreover, the high-speed image recognition computation dedicated logic 241 uses the information representing the shape and features of the predetermined object stored in the ROM 280 to compute to what extent the shape and features of an object currently being focused on resemble the shape and features of the predetermined object.

The image recognizing component 240 outputs, to the display control logic 260, a video signal on which information representing the recognition result of the processing by the high-speed image recognition computation dedicated logic 241 has been superimposed. For example, a video signal representing an image on which a mark such as a square or a circle has been drawn on a focused-on action is outputted.

Further, in a RAM 242 of the image recognizing component 240, temporary information used in the processing by the high-speed image recognition computation dedicated logic 241 is stored.

The display control logic 260 superimposes a description such as characters, a frame, or a menu on the image represented by the inputted video signal and outputs a video signal representing that image to the displaying component 30.

Figure 3:
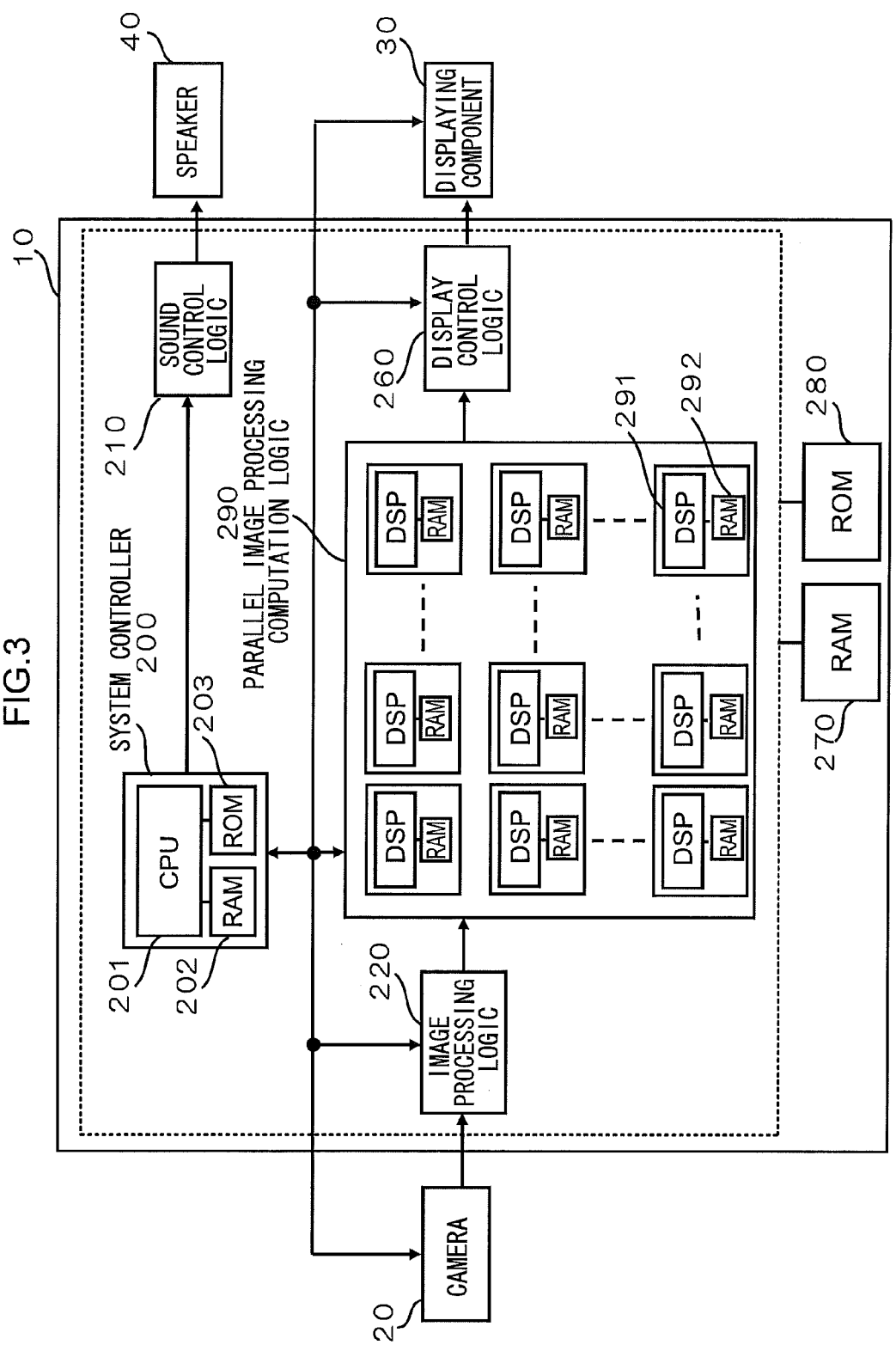
FIG. 3 is a drawing showing an example of the hardware configuration of the image processing device.

Instead of the hardware accelerator type shown in FIG. 2 and described above, the hardware configuration shown in FIG. 3 may also be used. FIG. 3 is a drawing showing an example of a hardware configuration (a second type: a parallel computing type using numerous digital signal processors (DSP)) of the image processing device 10. What is different about the hardware configuration shown in FIG. 3 is that a parallel image processing computing unit 290 is disposed instead of the pixel information conversion logic 230 and the image recognizing component 240 that were described in FIG. 2. In FIG. 3, the same signs are given to blocks that are the same as the blocks that were described in FIG. 2, and the processing content of those same blocks is also identical, so description will be omitted.

The image processing computing unit 290 is a unit in which numerous DSP units, each of which is configured by a pair comprising a DSP 291 and a RAM 292, are disposed. In the RAMs 292, temporary information used in the processing by the DSPs 291 is stored.

As shown in FIG. 3, the video signal that has been outputted from the image processing logic 220 is inputted to the parallel image processing computing unit 290. In the parallel image processing computing unit 290, the processing by the pixel information conversion logic 230 and the image recognizing component 240 that was described in FIG. 2 is performed with respect to the video signal, and that signal is outputted to the display control logic 260.

Of the two types of configurations described above, the merits of the hardware accelerator type shown in FIG. 2 include being able to realize a device (Large Scale Integration (LSI)) with higher speed and lower power consumption because it performs the image processing with dedicated custom logics and being able to realize a LSI with a small chip area (low cost) because the logics are dedicated logics and the circuits are optimized. The demerits of the hardware accelerator type shown in FIG. 2 include lacking versatility because the logics are dedicated custom logics.

The merits of the parallel computing type using numerous DSPs shown in FIG. 3 include having high versatility and being able to accommodate various forms of image recognition. The demerits of the parallel computing type using numerous DSPs include the chip area of the LSI becoming larger (its cost becoming higher) because it uses many DSPs, and portions acting uselessly arise and a lot of power consumption becomes necessary to realize an increase in speed comparable to dedicated logics because it is not made of dedicated logics.

Figure 4:
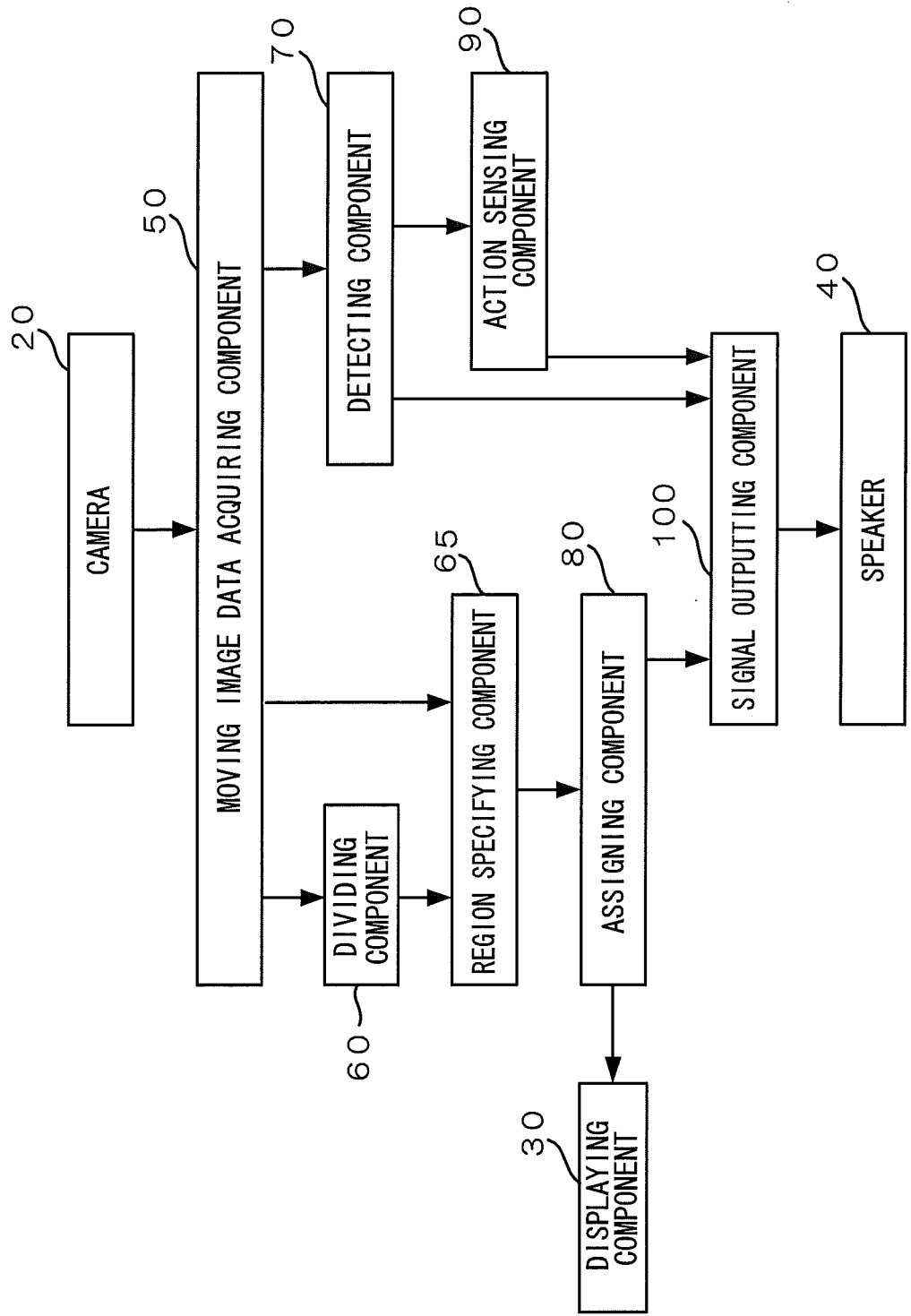
FIG. 4 is a functional block diagram of the image processing system.

FIG. 4 is a block diagram of a case where the image processing by the image recognizing component 240 or the parallel image processing computing unit 290 of the image processing system 1 is represented by functional blocks. In FIG. 4, the camera 20, a moving image data acquiring component 50, a dividing component 60, a region specifying component 65, a detecting component 70, an assigning component 80, an action sensing component 90, a signal outputting component 100, the displaying component 30, and the speaker 40 are shown.

The moving image data acquiring component 50 acquires from the camera 20 the moving image data representing the subject that has been captured by the camera 20 and provides the moving image data to the dividing component 60 and the detecting component 70. The dividing component 60 divides into multiple regions the image represented by the moving image data that have been acquired by the camera 20. Specifically, the dividing component 60 divides the image represented by the moving image data into multiple regions in accordance with a predetermined algorithm. The predetermined algorithm is, for example, an algorithm that divides the image from its left end to its right end into n (where n is a natural number) equal portions such as three equal portions.

The region specifying component 65 specifies one or more playing regions for generating predetermined sounds in the image represented by the moving image data that have been acquired by the moving image data acquiring component 50. Further, in a case where the image that has been divided into multiple regions by the dividing component 60 has been outputted, the region specifying component 65 specifies one or more of the playing regions for generating a predetermined sound from among the regions into which the image has been divided by the dividing component 60.

The detecting component 70 detects a specific image showing a specific subject existing in the image represented by the moving image data that have been acquired by the camera 20. A predetermined color and/or a predetermined object is/are used in the detection of this specific image. In the case of a color, that color can be specified by pixel value. In the case of an object, that object can be specified by pattern matching, for example.

The assigning component 80 assigns, for each of the playing regions that have been specified by the region specifying component 65, sounds to be outputted in a case where the specific image that has been detected by the detecting component 70 overlaps those playing regions. Moreover, in the case of assigning sounds to multiple regions, the assigning component 80 sequentially assigns sounds with different frequencies to each of the multiple regions. For example, in a case where the image has been divided into n (where n is an integer equal to or greater than 2) number of regions, the assigning component 80 may be configured to not assign a sound to the first region but sequentially assign different sounds beginning with the second region.

In a case where the specific image overlaps the playing regions, the signal outputting component 100 outputs to the speaker 40 signals representing the sounds that have been assigned to those playing regions by the assigning component 80. The sounds pertaining to the present embodiment include a melody, a song, a voice, etc. For the voice, for example, in a case where the regions have been divided by color as described later, the name of that color can be used for the sounds (if the color is red, "aka" or "red"). In this case, the image processing device pertaining to the present embodiment can be provided as an educational toy or a learning device.

Figure 5:
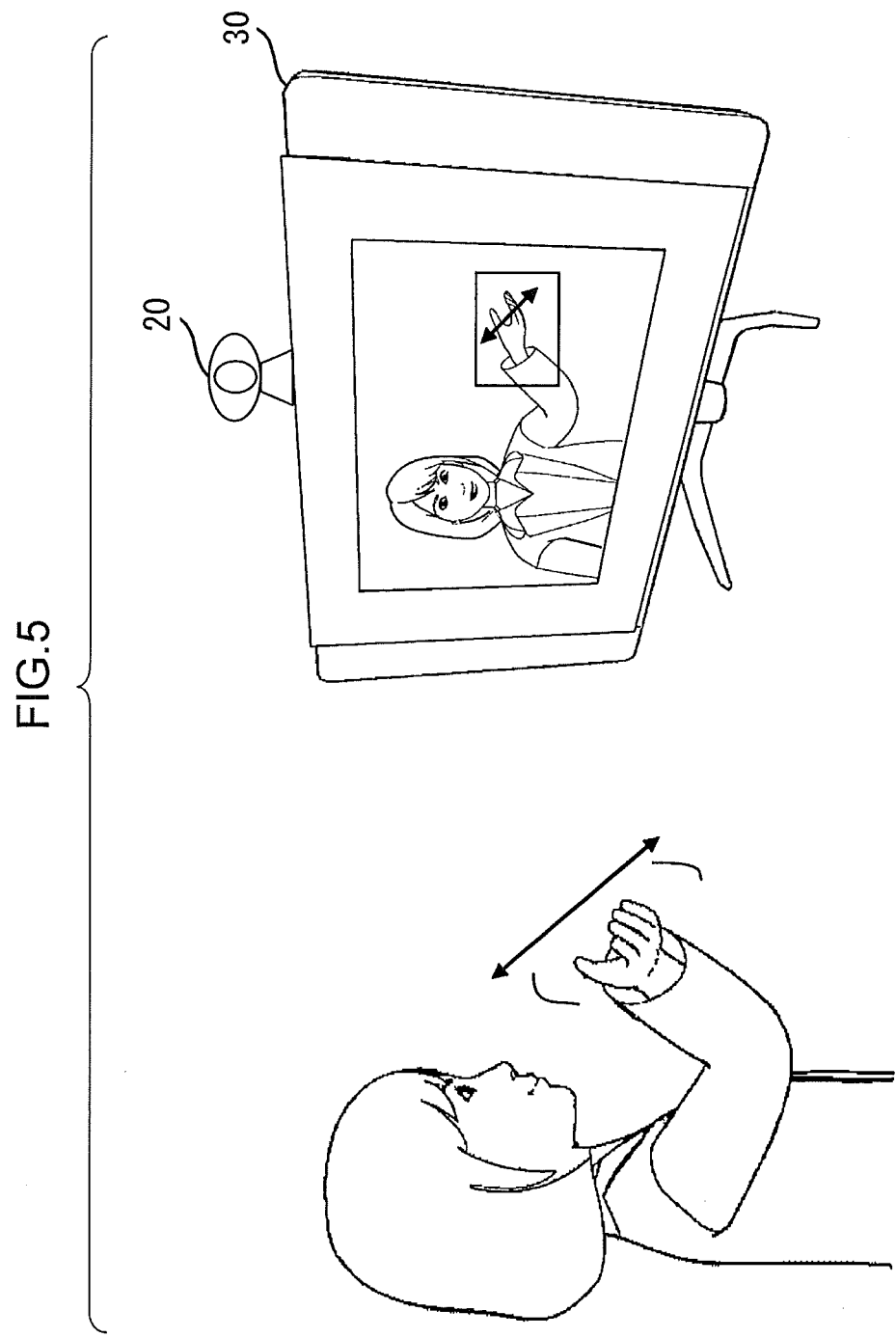
FIG. 5 is a drawing showing an example of an action of a particular subject.

The action sensing component 90 senses, with the specific image that has been detected by the detecting component 70, a special action of the specific subject. The special action here will be described using FIG. 5. FIG. 5 is a drawing showing an example of the special action of the specific subject. As shown in FIG. 5, a player performs, in a certain region indicated by the rectangle, a pattern of an action (an action such as wiggling the specific subject (e.g., a hand, a playing tool such as a drum stick) at a high speed horizontally, shaking the specific subject a little up and down, shaking the specific subject right or left, drawing a small circle, etc.) toward the camera 20 in a set amount of time, for example. Action information representing this action is recorded by the action sensing component 90 in the ROM 280, for example, that was described in FIG. 2 or FIG. 3. Specific examples of the action information include the displacement of the specific subject in a certain amount of time.

This action information is recorded before playing. Because of this, the special action can be recorded in accordance with that environment (light, shape, etc.) and, as a result, misrecognition can be suppressed. In a case where this specific subject has performed the special action represented by the recorded action information, information indicating that the special action has been performed is outputted to the signal outputting component 100. In this case, in a case where the specific image overlaps the regions to which the sounds have been assigned by the assigning component 80 and the special action has been performed, the signal outputting component 100 outputs the signals representing those sounds to the speaker 40.

In the block diagram described above, the minimum configuration of the image processing system 1 is a configuration excluding the displaying component 30 and the action sensing component 90.

Next, the details of the detecting component 70 will be described using FIG. 6. The detecting component 70 is configured by a color detecting component 70 and an object detecting component 74. The color detecting component 72 detects, as the specific subject, an image showing a subject of a predetermined color from the image that has been provided from the moving image data acquiring component 50. For example, in a case where the predetermined color is red, the color detecting component 72 detects a region of red in the image. The predetermined color may also be plural, and in this case multiple regions are detected.

The object detecting component 74 detects an image showing a subject of a predetermined object from the image that has been provided from the moving image data acquiring component 50. Examples of the predetermined object include a hand of the player and a drum stick.

Figure 6:
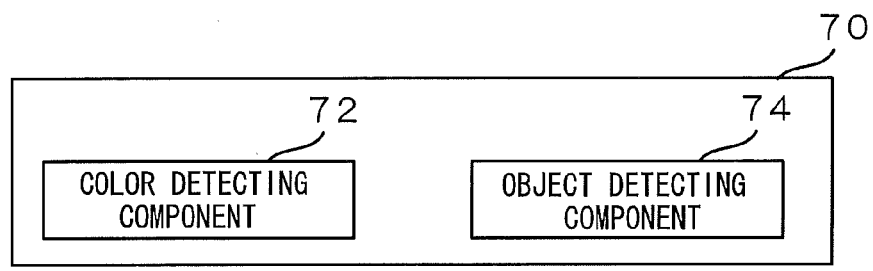
FIG. 6 is a drawing showing a detecting component.

In FIG. 6, the color detecting component 72 and the object detecting component 74 are shown, but the detecting component 70 may also be equipped with only either one.

Figure 7C:
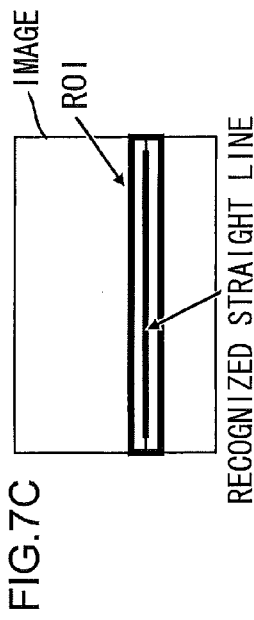
FIG. 7A to FIG. 7E are drawings showing one example of a case where an image is divided into multiple regions by a dividing component and an object is detected by an object detecting component.
Figure 7D:
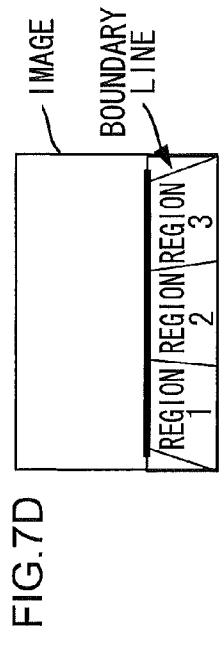
Figure 7E:
Figure 7B:
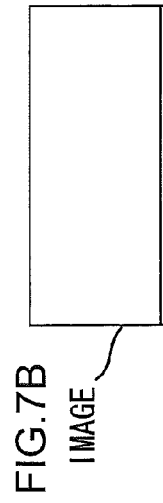
Figure 7A:
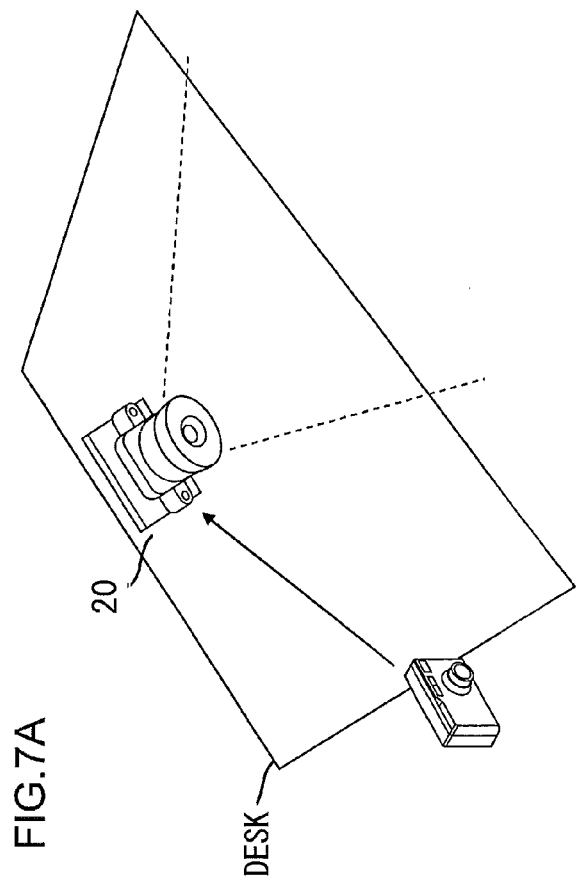

A summary of the image processing executed by the configuration described above will be described below. FIG. 7A to FIG. 7E are drawings showing one example of a case where the dividing component 60 divides the image into multiple regions and the object detecting component 74 detects the object. This example represents an example in a case where the camera 20 is placed on top of a desk. First, FIG. 7A to FIG. 7E will be briefly described. As shown in FIG. 7A, the camera 20 is placed on top of the desk. The camera 20 may be a video camera or a digital camera. As shown in FIG. 7B, the edge of the desk is captured horizontally. As shown in FIG. 7C, the edge of the desk (a horizontal line) is recognized by straight line recognition. As shown in FIG. 7D, regions of a desktop musical instrument are created on the basis of the horizontal line. As shown in FIG. 7E, the regions are assigned to a high-pitched, middle-pitched, low-pitched or other musical instrument. When those regions are touched by hand, musical instrument sounds are produced.

As shown in FIG. 7A to FIG. 7E, by first placing the camera 20 on top of the desk, an image including the edge of the desk is obtained. In that image, first the edge of the desk is recognized as a horizontal line. This image recognition processing is processing that can be easily executed by using a common image recognition technique such as edge detection, for example. In FIG. 7C, "ROI" means "region of interest".

Next, the dividing component 60 divides the image into multiple regions (e.g., three regions) adjacent to each other in the direction along the horizontal line on the basis of the horizontal line. Then, the region specifying component 65 specifies regions 1 to 3 as the playing regions. In a case where the image has been divided into three regions, the assigning component 80 sequentially assigns sounds with different frequencies to each of the regions 1 to 3. In FIG. 7A to FIG. 7E, sounds with frequencies corresponding to a scale, such as a high-pitched sound, a middle-pitched sound, and a low-pitched sound, are sequentially assigned. Because of this, a desktop musical instrument is created. Information indicating which sounds are to be assigned with respect to which regions may also be stored beforehand in the ROM 280, and the assigning component 80 may use that information to assign the sounds.

The detecting component 70 detects a specific image showing a finger, for example, which acts at the time of playing the musical instrument as the specific subject. Then, in a case where the specific subject overlaps the regions to which the sounds have been assigned, the signal outputting component 100 outputs the signals representing those sounds to the speaker 40, whereby the sounds are produced.

As shown in FIG. 7A to FIG. 7E, in a case where the dividing component 60 divides the image into multiple regions and the displaying component 30 is disposed, the displaying component 30 may also be configured to display the boundary lines of the divided regions.

FIG. 8A to FIG. 8E are drawings showing one example of a case where the region specifying component 65 specifies the playing regions without the dividing component 60 performing division. This example represents an example where the camera 20 is placed on top of a desk and a sheet on which the divided regions are shown beforehand is used.

Figure 8C:
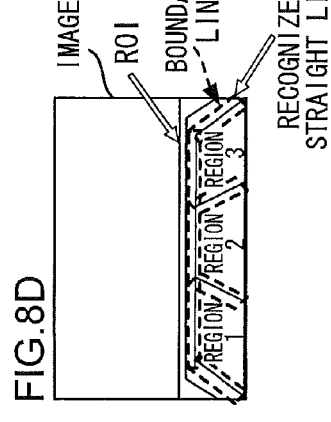
FIG. 8A to FIG. 8E are drawings showing one example of a case where a playing region is identified by a region specifying component without being divided by the dividing component.
Figure 8E:
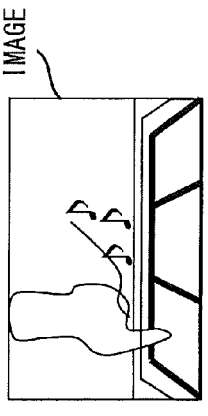
Figure 8D:
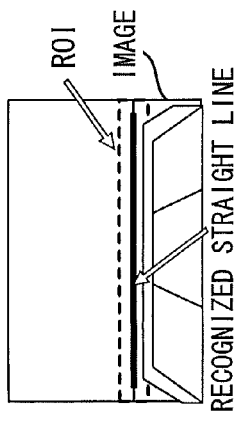
Figure 8B:
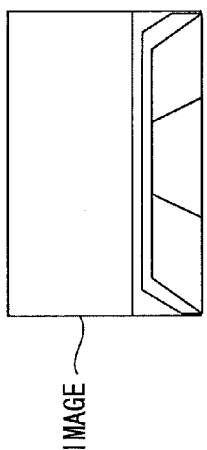
Figure 8A:
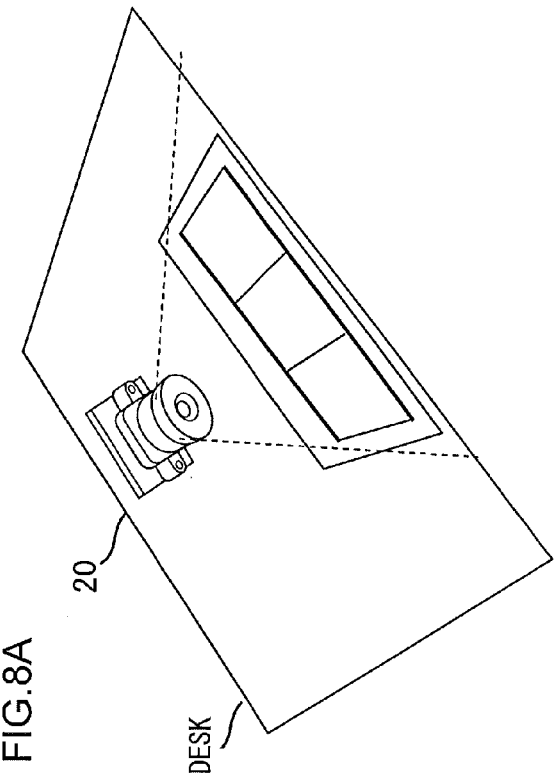

First, FIG. 8A to FIG. 8E will be briefly described. As shown in FIG. 8A, the camera 20 is placed on top of the desk, and the sheet on which the regions are printed or drawn is also placed on top of the desk. The camera 20 may be a video camera or a digital camera. As shown in FIG. 8B, the edge of the desk is captured horizontally, and the sheet is also captured. As shown in FIG. 8C, the edge of the desk (a horizontal line) is recognized by straight line recognition, and the sheet in front of the horizontal line is also recognized. As shown in FIG. 8D, next, region lines are recognized. As shown in FIG. 8E, the playing regions of a musical instrument are created inside the desktop sheet. When the playing regions are touched by hand, musical instrument sounds are produced.

As shown in FIG. 8A to FIG. 8E, by first placing the camera 20 on top of the desk, an image including the edge of the desk is obtained. In that image, first the edge of the desk is recognized as a horizontal line.

Next, the region specifying component 65 recognizes the boundary lines of the regions that have been recorded by printing or the like on the sheet and specifies the multiple regions (three in FIG. 8A to FIG. 8E) enclosed along those boundary lines as the playing regions. Then, the assigning component 80 sequentially assigns sounds with different frequencies to each of the multiple divided regions, such as each of regions 1 to 3, for example. Because of this, a desktop musical instrument is created.

The detecting component 70 detects the specific image showing a finger in the same way as described above as the specific subject. Then, in a case where the specific subject overlaps the regions to which the sounds have been assigned, the signal outputting component 100 outputs the signals representing those sounds to the speaker 40, whereby the sounds are produced.

FIG. 9A to FIG. 9E are drawings showing an example of a case where a device capable of drawing the regions on the subject, such as a projector, is used instead of the sheet in FIG. 8A to FIG. 8E.

First, FIG. 9A to FIG. 9E will be briefly described. As shown in FIG. 9A, the camera 20 is placed on top of the desk, and the regions are drawn on the desk by a projector or the like. The camera 20 may be a video camera or a digital camera. As shown in FIG. 9B, the edge of the desk is captured horizontally, and the drawn regions are also captured. As shown in FIG. 9C, the edge of the desk (a horizontal line) is captured by straight line recognition, and the regions in front are also captured. As shown in FIG. 9D, the region lines are recognized on the basis of the horizontal line. As shown in FIG. 9E, the playing regions of a desktop musical instrument are automatically created.

In this case, the image obtained by the camera 20 is the same in both the case where the sheet is used and the case where the projector is used, so the processing executed in FIG. 9A to FIG. 9E becomes the same as the processing executed in FIG. 8A to FIG. 8E.

FIG. 10A to FIG. 10E are drawings showing one example of a case where the region specifying component 65 specifies the playing regions and the object detecting component 74 detects an image showing colors. This example represents an example of a case where the camera 20 is placed on top of a desk and colored objects are also placed on top of the desk.

Figure 10C:
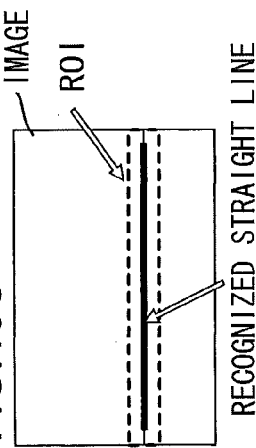
FIG. 10A to FIG. 10E are drawings showing one example of a case where a playing region is identified by the region specifying component and an image showing a color is detected by the object detecting component.
Figure 10D:
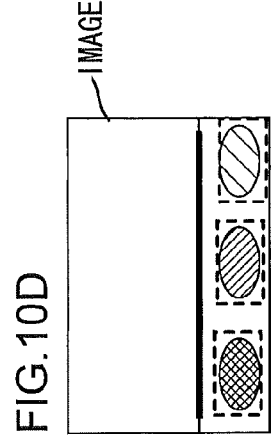
Figure 10E:
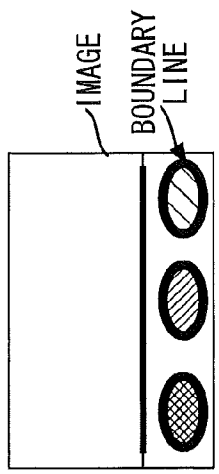
Figure 10B:
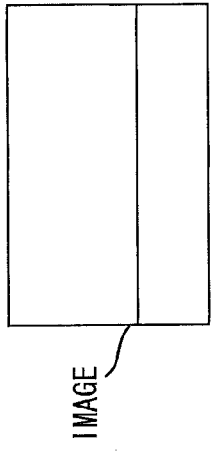
Figure 10A:
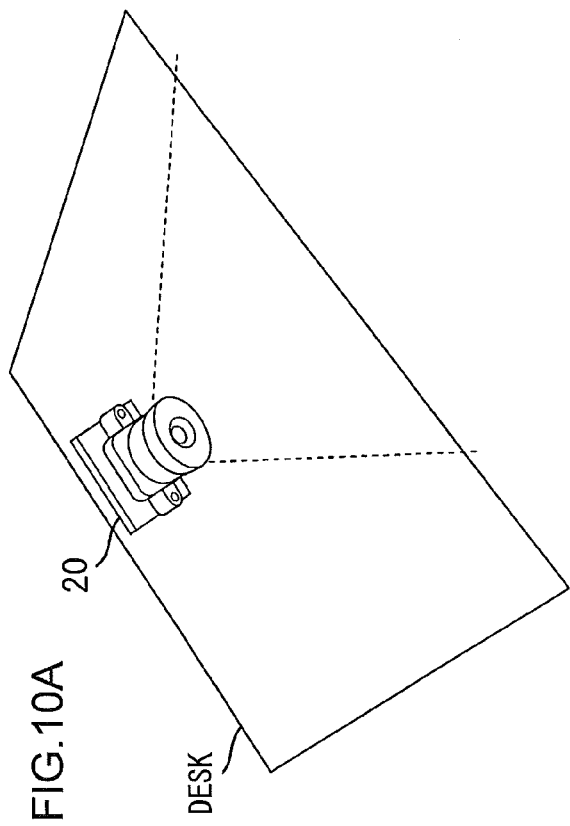

First, FIG. 10A to FIG. 10E will be briefly described. As shown in FIG. 10A, the camera 20 is placed on top of the desk. The camera 20 may be a video camera or a digital camera. As shown in FIG. 10B, the edge of the desk is captured horizontally. As shown in FIG. 10C, the edge of the desk (a horizontal line) is recognized by straight line recognition. As shown in FIG. 10D, playable regions are created on top of the desk on the basis of the horizontal line. When colored objects are placed in the playable regions, those are defined as actual recognition regions. As shown in FIG. 10E, when the colored objects located in the playable regions are touched by hand, musical instrument sounds are produced.

As shown in FIG. 10A to FIG. 10E, by first placing the camera 20 on top of the desk, an image including the edge of the desk is obtained. In that image, first the edge of the desk is recognized as a horizontal line.

Next, the region specifying component 65 recognizes the colored objects and their neighborhoods and specifies the regions in which the colored objects exist as playing regions. The assigning component 80 sequentially assigns sounds with different frequencies to each of the regions.

The detecting component 70 detects a specific image showing a hand, for example, as the specific subject. Then, in a case where the specific subject overlaps the regions to which the sounds have been assigned, the signal outputting component 100 outputs signals representing those sound to the speaker 40, whereby the sounds are produced.

FIG. 11A to FIG. 11D are drawings showing an example of a case where the positions where the colored objects are placed are on the clothes of the player instead of on the desktop in FIG. 10A to FIG. 10E. The colored objects may be placed on (stuck to) the clothes of the player, but as shown in FIG. 11A to FIG. 11D, clothes that have been colored beforehand may also be used.

Figure 11B:
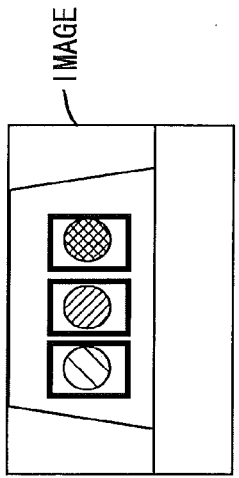
FIG. 11A to FIG. 11D are drawings showing an example of a case where the position in which a colored object is to be placed is put on the clothes of a player instead of on a desk.
Figure 11C:
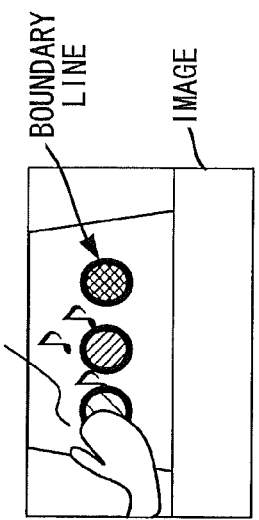
Figure 11D:
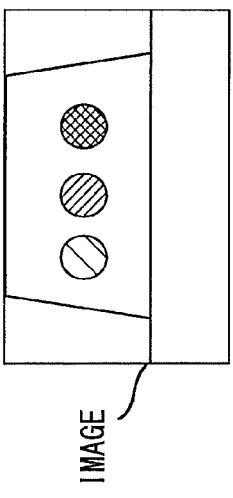
Figure 11A:
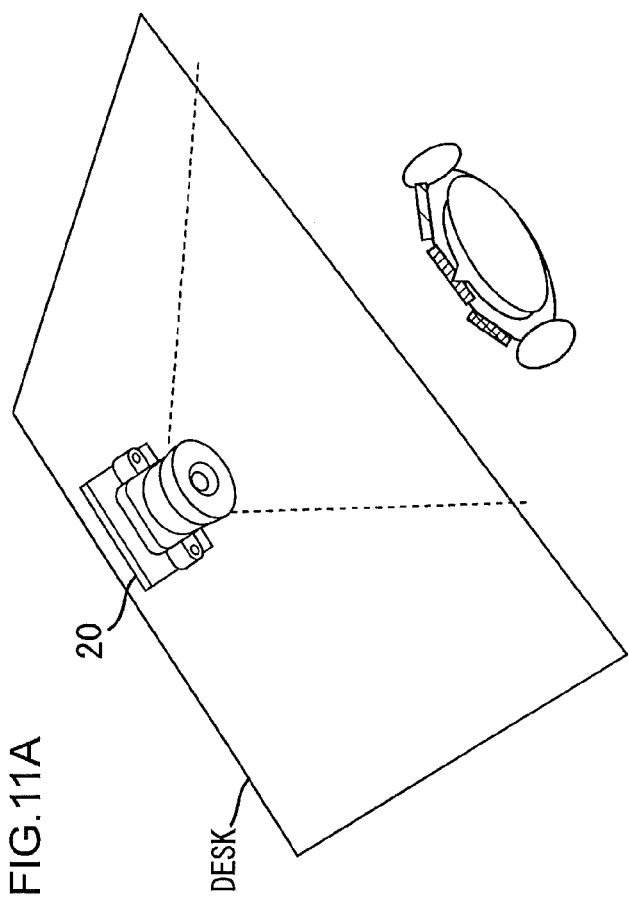

First, FIG. 11A to FIG. 11D will be briefly described. As shown in FIG. 11A, the camera 20 is placed on top of the desk, and the player wearing clothes including a pattern of particular colors or shapes positions himself or herself in front of the camera 20 and in front of the edge of the desk. The camera 20 may be a video camera or a digital camera. As shown in FIG. 11B, the pattern of the particular colors or shapes is captured. As shown in FIG. 11C, by recognizing the pattern of the particular colors or shapes, the playable regions are generated. As shown in FIG. 11D, when the playable regions are touched by hand, musical instrument sounds that have been set are produced.

In this case, the image obtained by the camera 20 is the same in both the case where the colored objects are placed on the desk and the case where the colored clothes are used, so the processing executed in FIG. 11A to FIG. 11D becomes the same as the processing executed in FIG. 10A to FIG. 10E.

In the processing summary described above, a desk was used, but as will be understood from the processing summary described above, the present embodiment is not limited to a desk and can also be executed using a curtain or the like, for example.

Figure 12:
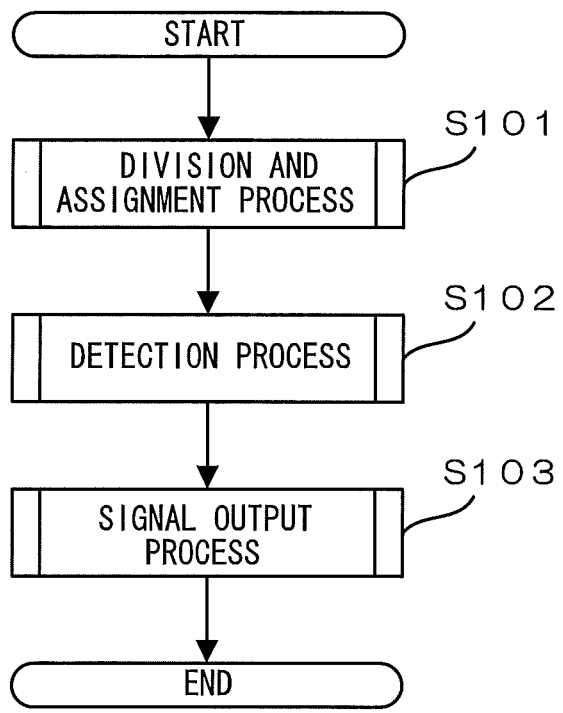
FIG. 12 is a flowchart showing a flow of image processing overall.

A flow of the image processing described above will be described using flowcharts showing a program executed by the image processing device 10. The flowcharts described below show a flow of processing by a program executed by the system controller 200 or the parallel image processing and computing unit 290 and each logic described in FIG. 2 and FIG. 3. FIG. 12 is a flowchart showing a flow of the image processing overall.

First, in step 101, a division and assignment process, which divides the image represented by the moving image data into multiple regions, specifies the playing regions from among those regions, and assigns the sounds to the playing regions, is executed by the dividing component 60, the region specifying component 65, and the assigning component 80. In this division and assignment process, a process in a case where the image is not divided by the dividing component 60 such as described later is also included.

In the next step 102, a detection process, which detects the specific image showing the specific subject existing in the image represented by the moving image data that have been acquired by the camera 20, is executed by the detecting component 70. Then, in step 103, a signal output process, which in a case where the specific image overlaps the playing regions outputs signals representing those sounds to the speaker 40, is executed by the signal outputting component 100. Then, the image processing ends.

In this flowchart, the detection process is expediently executed after the division and assignment process, but it is more efficient for the division and assignment process and the detection process to be executed in parallel. That is, in a case where the processes are executed by software, these two processes may be started by different threads and executed in parallel.

Figure 13:
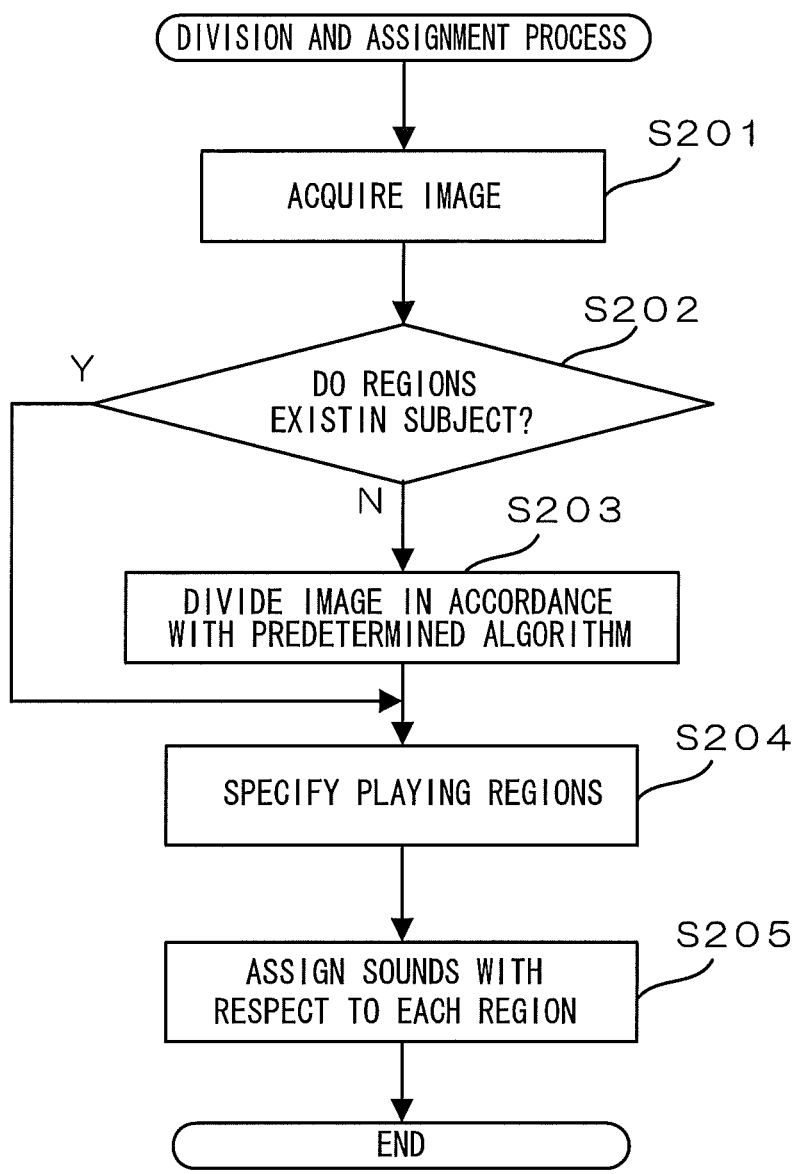
FIG. 13 is a flowchart showing details of division and assignment processing.

The details of each of the above processes will be described. FIG. 13 is a flowchart showing the details of the division and assignment process.

First, in step 201, the image that has been acquired by the camera 20 is acquired from the moving image data acquiring component 50. In the next step 202, it is determined whether or not there regions shown beforehand exist on the subject by judging whether or not multiple boundary lines representing boundaries of the regions have been captured.

In a case where the determination is YES in step 202, the process advances to step 204. In a case where the determination is NO in step 202, the process advances to step 203 where the image is divided in equal intervals, for example, into multiple regions adjacent to each other along a reference line such as a horizontal line in accordance with the aforementioned predetermined algorithm. Then, the process advances to the sub-process of step 204.

In step 204, the playing regions are specified from among the divided regions or the regions shown beforehand in the subject. Then, in step 205, sounds with different frequencies are assigned with respect to each of the playing regions such that a scale is configured. Then, the division and assignment process ends.

Figure 14:
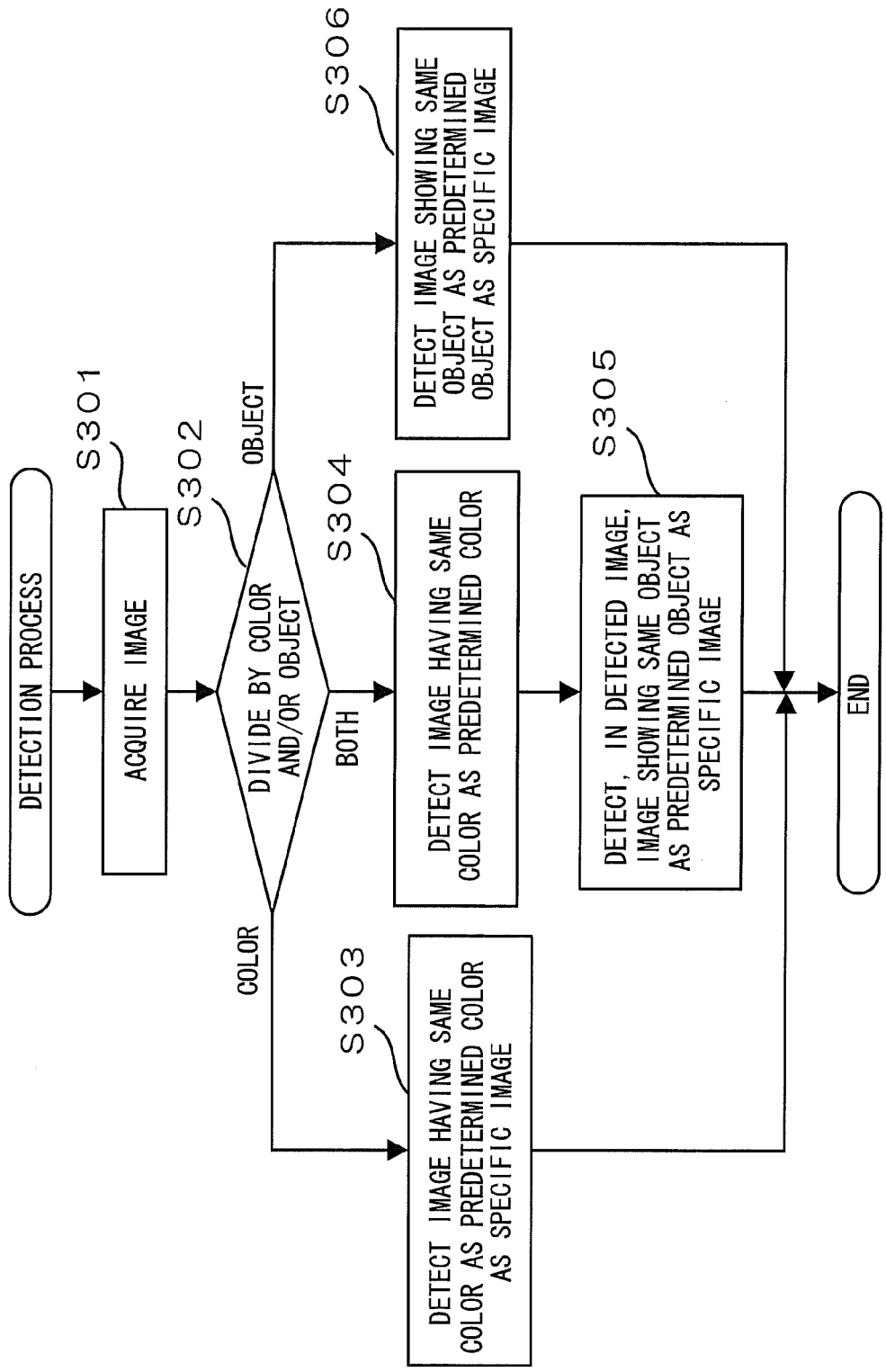
FIG. 14 is a flowchart showing details of detection processing.

FIG. 14 is a flowchart showing the details of the detection process. This detection process is a process that detects the specific image, but detection of the specific image includes detection using the subject of the predetermined color and detection of the subject of the predetermined object. Specifically, in a case where a hand is used to play, for example, detection of the specific image includes a case where the specific image is detected using the subject of the color (skin color) of the hand and a case where the specific image is detected using the subject of the shape of the hand.

First, in step 301, the image that has been acquired by the camera 20 is acquired from the moving image data acquiring component 50. In the next step 302, the process branches depending on whether either one of the subject of the predetermined color and the subject of the predetermined object is to be used as the specific subject or both are to be used as the specific subject. For example, in a case where a hand is used to play, for example, the subject of the skin color is detected, or the subject having the shape of a hand is detected, or the subject of the skin color and having the shape of a hand is detected.

First, in a case where the process is performed using the subject of the predetermined color as the specific subject, in step 303, an image having the same color as the predetermined color is detected as the specific image. Then, the process ends. In a case where the process is performed using the subject of the predetermined object, in step 306, an image showing the same object as the predetermined object is detected as the specific image. Then, the process ends.

In a case where the process is performed using both, in step 304, first an image having the same color as the predetermined color is detected. In the next step 305, in the detected image, an image showing the same object as the predetermined object is detected as the specific image. Then, the process ends. This detection process may be performed every image (frame) acquired by the camera 20 or may be performed every several frames.

Figure 15:
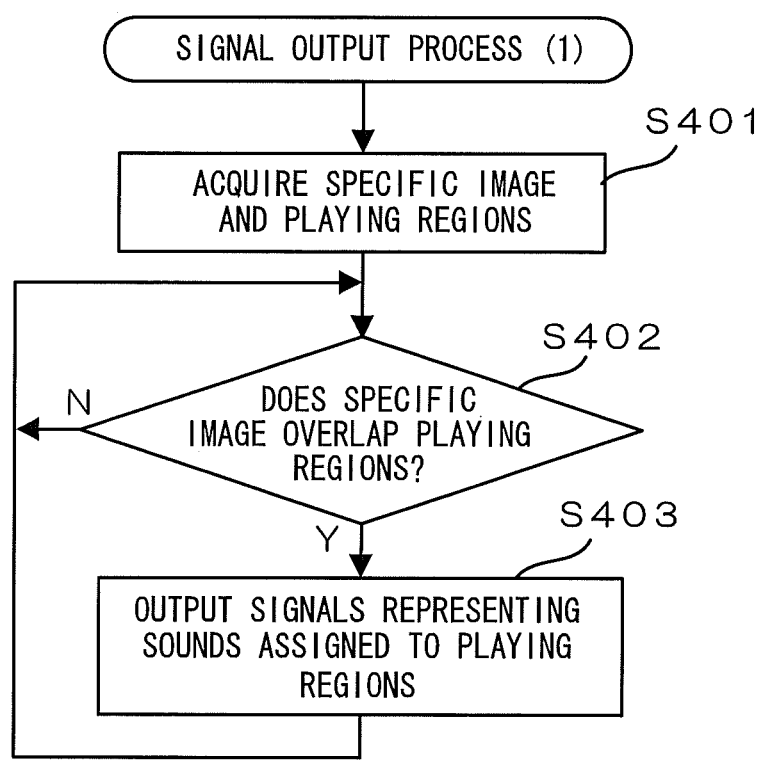
FIG. 15 is a flowchart showing details of signal output processing.

FIG. 15 is a flowchart showing the details of the signal output process. First, in step 401, the specific image that has been detected by the detection process and the playing regions that have been specified by the division and assignment process are acquired. Specifically, information representing the region of the specific image and information representing each of the playing regions that have been specified are acquired. For example, in a case where the entire image has XY coordinates, the information representing the regions becomes information using the coordinate values of the XY coordinates.

In the next step 402, it is determined whether or not the specific image overlaps the playing regions. In case where the determination is YES, the process advances to step 403 where signals representing the sounds that have been assigned to those regions are outputted to the speaker 40. Then, the process again returns to the sub-process of step 402. In the case of a region to which a sound has not been assigned, a signal is of course not outputted. In a case where the determination is NO in step 402, the process again returns to the sub-process of step 402.

This signal output process may be configured to end in a case where the player has performed a certain operation, for example, or in a case where a user interface is disposed in the image processing device 10 and a certain input has been made.

FIG. 16 is a flowchart showing the signal output process in a case where the image processing system pertaining to the present embodiment is provided as the aforementioned educational toy.

In step 501, in addition to the specific image that has been acquired in the sub-process of step 401 and the regions into which the image has been divided by the division and assignment process, the colors of the regions are acquired. Because of this, colors are associated with each of the regions. In the next step 502, it is determined whether or not the specific image overlaps the regions. In a case where the determination is YES, the process advances to step 503 where a signal representing a voice corresponding to the color of the region is outputted to the speaker 40. Then, the process again returns to the sub-process of step 502. When the determination is NO in step 502, the process again returns to the sub-process of step 402.

In the embodiment described above, there exist two embodiments consisting of a case where the divided regions are shown beforehand on the subject and a case where the divided regions are not shown beforehand on the subject. There also exist two embodiments consisting of a case where the displaying component 30 is disposed and a case where the displaying component 30 is not disposed.

Moreover, by using at least one of the subject of the predetermined color and the subject of the predetermined object as the specific subject, there also exist three (color, object, both) embodiments. Further, there also exist two embodiments consisting of a case where the action sensing component 90 is disposed and a case where the action sensing component 90 is disposed.

Consequently, in the present embodiment, there exist 2×2×3×2=24 embodiments.

Additionally, in the embodiment where the divided regions are shown beforehand, by using the aforementioned sheet or the like to show beforehand the regions in which it is easy for the player to play, it becomes possible to make it easier to play. On the other hand, in the embodiment where the divided regions are not shown beforehand on the subject, the player can play without having to prepare that subject.

In the embodiment where the displaying component 30 is disposed, it becomes possible for the player to play while viewing the displaying component 30, so it made be made even easier for the player to play. On the other hand, in the embodiment where the displaying component 30 is not disposed, the player can play without having to prepare the displaying component 30.

In the embodiment where the subject of the predetermined color is used as the specific subject, for example, in a case where a hand is used to play, by setting the color to be skin color, the specific image can be detected more reliably. Particularly in the playing of a sound or melody using a hand, robustness is ensured more than in a case where the predetermined object is used.

Further, in the embodiment where the subject of the predetermined object is used as the specific subject, it becomes possible to use various objects such as a drum stick, for example, to play. Moreover, in the embodiment where both the subject of the predetermined color and the predetermined object are used, there is the potential for misrecognition with only either one (e.g., if only color is used, there is also the potential for misrecognition with respect to something in which there is virtually no movement), but by using both, an image processing system in which robustness is ensured with respect to operation can be provided.

Further, regarding the action sensing component 90, in the technology of JP-A No. 2003-202833, there has been the drawback that it cannot be realized unless a picture equivalent to a predetermined input pattern is drawn in an input area on the display device, and there has been the drawback that the drawing area on the drawing device cannot be used as a playing region. Further, for example, there has been the drawback that its robustness with respect to the environment at the time of imaging is low which is that, for example, the musical instrument does not produce a sound if the image of the shape of the finger does not have the same shape (or color) as the pattern to be detected.

In contrast, because of the action sensing component 90, it becomes possible to store the color and the action of a hand or a tool that plays in the image processing system 1 in a specific amount of time just before playing, so it is not necessary to draw a picture equivalent to a predetermined input pattern in an input area on a display device like in the technology described in JP-A No. 2003-202833, the degree of freedom of the regions for playing increases, and, just before playing, a standard for sensing the color, action, or both of a hand or a tool that plays can be set by the unique way it appears with respect to conditions at times of the hand or the tool that plays with respect to the lighting environment and camera in that location, so the problem of robustness with respect to the environment at the time of imaging which was that the musical instrument does not produce a sound if the picture pattern of the shape of the finger is not the same shape (or color) as the detection pattern which was a drawback in the technology disclosed in JP-A No. 2003-202833 can be solved.

For example, although the actual picture (color, shape) that appears in the camera at that time differs greatly because of the color and brightness of the lighting in that location and the way outside light enters, sensing of the action to be detected just before playing becomes possible regardless of the light ray environment and the way something appears.

Further, according to the present embodiment, with an actual camera, depending on the direction of the camera and so forth, sometimes the camera only sees one finger even if the player holds up two fingers, but in the image processing system 1, both when there is one finger and two fingers the system judges that they look like fingers and it becomes possible to produce a sound or a melody.

In this way, the image processing system 1 pertaining to the present embodiment is a system with which it is easy for a player to play and is a system whose convenience and versatility are high and with which advanced musical instrument playing becomes possible. Moreover, the image processing system 1 pertaining to the present embodiment is an excellent system whose robustness is ensured as described above.

The flows of processing in the flowcharts described in the above embodiment (FIG. 12 to FIG. 16) are examples and can be appropriately changed in a scope that does not depart from the gist of the present invention.

What is claimed is:

1. An image processing system comprising:
an acquiring component that captures a subject to thereby acquire moving image data representing that subject, the acquiring component additionally capturing pre-defined data;
a region specifying component that specifies one or more playing regions for generating predetermined sounds in an image represented by the moving image data that have been acquired by the acquiring component, the one or more playing regions being specified based at least in part on the pre-defined data captured by the acquiring component;
a detecting component that detects a specific image showing a specific subject existing in the image represented by the moving image data that have been acquired by the acquiring component;
an assigning component that assigns, for each of the playing regions that have been specified by the region specifying component, sounds to be outputted in a case where the specific image that has been detected by the detecting component overlaps those playing regions; and
a signal outputting component which, in a case where the specific image overlaps the playing regions, outputs signals representing the sounds that have been assigned to those playing regions by the assigning component.

2. The image processing system of claim 1, further comprising a dividing component that divides into multiple regions the image represented by the moving image data that have been acquired by the acquiring component, wherein the region specifying component specifies one or more of the playing regions for generating the predetermined sounds from among the regions into which the image has been divided by the dividing component.

3. The image processing system of claim 1, wherein in the case of assigning sounds to a plurality of the playing regions, the assigning component sequentially assigns sounds with different frequencies to each of the plural playing regions.

4. The image processing system of claim 1, further comprising a displaying component that displays the image represented by the moving image data that have been acquired by the acquiring component.

5. The image processing system of claim 4, wherein the displaying component further displays boundary lines of the playing regions.

6. The image processing system of claim 1, wherein
the playing regions that are specified by the region specifying component are shown beforehand on the subject, and
the region specifying component specifies one or more of the playing regions for generating the predetermined sounds from among the regions that are shown on the subject.

7. The image processing system of claim 1, wherein the specific subject is a subject of at least one of a subject of a predetermined color and a subject of a predetermined object.

8. The image processing system of claim 1, further comprising
an action sensing component that senses, with the specific image that has been detected by the detecting component, an action of the specific subject and
a recording component that records action information representing the action of the specific subject that has been sensed by the action sensing component,
wherein in a case where the specific image overlaps the regions to which the sounds have been assigned by the assigning component and the action of the specific subject that has been sensed by the action sensing component is the action represented by the action information that has been recorded by the recording component, the signal outputting component outputs the signals representing the sounds.

9. The image processing system of claim 1, further comprising a sound outputting component that outputs the sounds in accordance with the signals that have been outputted by the signal outputting component.

10. A non-transitory computer readable storage medium storing a program of instructions executable by the computer to function as an image processing system that includes:
a region specifying component that specifies one or more playing regions for generating predetermined sounds in an image represented by moving image data that have been acquired by an acquiring component, which captures a subject to thereby acquire moving image data representing that subject, the one or more playing regions being specified based at least in part on pre-defined data that has also been acquired by the acquiring component;
a detecting component that detects a specific image showing a specific subject existing in the image represented by the moving image data that have been acquired by the acquiring component;
an assigning component that assigns, for each of the playing regions that have been specified by the region specifying component, sounds to be outputted in a case where the specific image that has been detected by the detecting component overlaps those playing regions; and
a signal outputting component which, in a case where the specific image overlaps the playing regions, outputs signals representing the sounds that have been assigned to those playing regions by the assigning component.

11. The image processing system of claim 1, wherein the pre-defined data is data that determines a boundary for each of the one or more playing regions.

12. The image processing system of claim 1, wherein the acquiring component comprises a camera, and wherein the pre-defined data is an image of an edge of a platform that supports the camera.

13. The image processing system of claim 1, the wherein there are a plurality of playing regions, wherein each playing region is assigned a sound corresponding to that playing region, and wherein a signal representing the sound assigned to one of the playing regions is output when the specific image overlaps that playing region.

14. The image processing system of claim 1, wherein the acquiring component comprises a camera that is aimed at a player, and the specific image is an image of an object that is moved by the player.

15. An image processing system for use with a camera that is supported by a platform and a display device that is visible by a player at whom the camera is aimed, comprising:
a region specifying component that specifies a plurality of playing regions that are depicted on the display device, each playing region having a boundary that is set in accordance with an image from the camera representing an edge of the platform;
a detecting component that detects, in the image from the camera, a specific image of an object that is movable by the player;
an assigning component that assigns sounds to the playing regions; and
a signal outputting component which, when the specific image overlaps one of the playing regions, outputs a signal representing the sound that has been assigned to that playing region.

* * * * *